United States Patent
Bergendorf

Patent Number: 5,360,071
Date of Patent: Nov. 1, 1994

[54] GARDENING TOOL HAVING DIVERGING PRONGS AND STRAIGHT PRONGS

[76] Inventor: Frank H. Bergendorf, P.O. Box 4592, Pocatello, Id. 83205

[21] Appl. No.: 102,255

[22] Filed: Aug. 5, 1993

[51] Int. Cl.⁵ .............................................. A01B 1/00
[52] U.S. Cl. ..................................... 172/378; 294/49; 172/371
[58] Field of Search ................ 172/378–380, 172/371; 294/55.5, 52, 49; 56/400.16, 400.01

[56] References Cited

U.S. PATENT DOCUMENTS

| | | |
|---|---|---|
| D. 21,934 | 10/1892 | Putnam . |
| D. 31,896 | 11/1899 | Swartz . |
| D. 161,131 | 12/1950 | Scott ........................ D39/1 |
| 54,711 | 5/1866 | Frohock ...................... 294/52 |
| 177,498 | 5/1876 | Gebhardt ................... 294/52 |
| 269,557 | 12/1882 | Banvoetz . |
| 614,512 | 11/1898 | Spitzenberg . |
| 1,133,021 | 3/1915 | Gunn . |
| 1,151,209 | 8/1915 | Makboulian . |
| 1,336,203 | 4/1920 | Crago ....................... 294/55.5 |
| 1,652,478 | 12/1927 | Herman . |
| 1,857,500 | 5/1932 | Davison . |
| 2,268,252 | 12/1941 | Helmers ........................ 97/63 |
| 2,738,214 | 3/1956 | Zimmers ................ 56/400.16 |
| 4,203,210 | 5/1980 | Hadlick, Jr. ................. 294/49 |
| 4,655,494 | 4/1987 | Eads et al. .................. 294/49 |

FOREIGN PATENT DOCUMENTS 1420192  1/1976  United Kingdom ............... 172/378

Primary Examiner—Randolph A. Reese
Assistant Examiner—Spencer Warnick
Attorney, Agent, or Firm—Jacobson, Price, Holman & Stern

[57] ABSTRACT

A gardening tool for digging around weeds, vegetables, bushes, etc., and in particular, a gardening tool having a handle, two laterally mounted straight prongs extending parallel to one another, and a medially mounted pair of diverging prongs which extend in a gradually diverging manner from one another to define a V-shaped member.

21 Claims, 1 Drawing Sheet

GARDENING TOOL HAVING DIVERGING PRONGS AND STRAIGHT PRONGS

BACKGROUND OF THE INVENTION

The present invention relates to a gardening tool for digging around weeds, vegetables, bushes, etc., and in particular, a gardening tool having a handle, two laterally mounted straight prongs extending parallel to one another, and a medially mounted pair of diverging prongs which extend in a gradually diverging manner from one another to define a V-shaped member.

The need currently exists for a gardening tool which can straddle weeds, vegetables, bushes, and other such forms of vegetation, the prior art includes conventional shovels and spades. However, neither of these devices includes a gap medially at the digging end of the tool, which gap would allow the tool to straddle vegetation.

SUMMARY OF THE INVENTION

It is therefore a primary object of the present invention to overcome the shortcomings of the prior art, by providing a gardening tool capable of straddling vegetation.

A further object of the present invention is to provide a single gardening tool which would allow a gardener to dig contemporaneously on opposite sides of vegetation, to thereby facilitate removal of the vegetation from the ground.

To achieve these and other objects, the present invention provides a gardening tool having a handle, two laterally mounted straight prongs extending parallel to one another, and a medially mounted pair of diverging prongs which extend in a gradually diverging manner from one another to define a V-shaped member. Preferably, the diverging prongs and the straight prongs include pointed distal tips to facilitate penetration into the ground. In addition, the distal tips of the diverging prongs preferably overlap the distal tips of the straight prongs, with the distal tips of the straight prongs extending slightly beyond that of the diverging prongs.

DETAILED DESCRIPTION OF THE PREFERRED EMBODIMENTS

Figure 1:
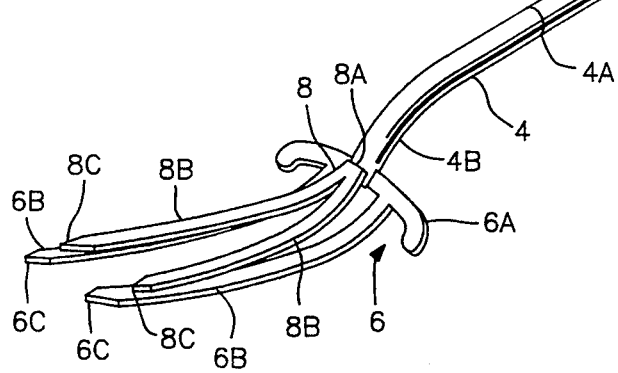
FIG. 1 is perspective view of a preferred embodiment of the gardening tool of the present invention.
Figure 1:
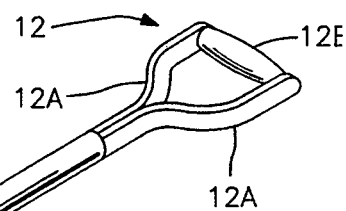
Figure 2:
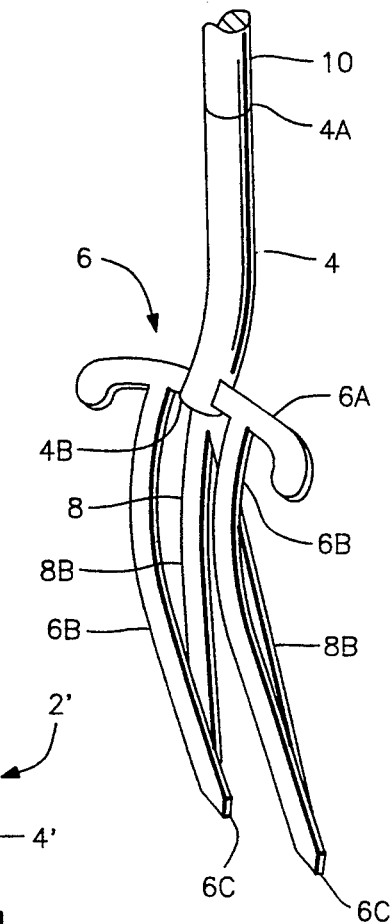
FIG. 2 is a rear perspective view of the preferred embodiment illustrated in FIG. 1.

A preferred embodiment of the gardening tool of the present invention will now be described with reference to FIGS. 1 and 2.

The gardening tool 2 comprises a metal sleeve 4 having an open end 4A and a closed end 4B; a $\pi$-shaped member 6 attached to the closed end 4B of the metal sleeve 4; a V-shaped member 8 also attached to the closed end 4B of the metal sleeve 4; a wooden shaft 10 received in the open end 4A of the metal sleeve 4; and a handle 12 connected to an end of the wooden shaft 10, opposite from the metal sleeve 4.

The $\pi$-shaped member 6 comprises an arced bracket 6A and two laterally disposed, substantially parallel and downwardly extending straight prongs 6B. Each of the straight prongs 6B terminates at a pointed distal tip 6C.

The V-shaped member 8, on the other hand, comprises an apex 8A, and two medially mounted and gradually diverging prongs 8B. The diverging prongs 8B terminate with pointed distal tips 8C. Preferably, the distal tips 8C of the diverging prongs 8B overlap the distal tips 6C of the straight prongs 6B, with the distal tips 6C of the straight prongs 6B extending slightly beyond that of the diverging prongs 8B.

Both the $\pi$-shaped member 6 and the V-shaped member 8 are constructed from a substantially flat material, which curves slightly as the V-shaped member 8 and the $\pi$-shaped member 6 connect to the metal sleeve 4.

The metal sleeve 4 is also curved or bent, but oppositely with respect to the curvature of the $\pi$-shaped member 6 and the V-shaped member 8. This curvature of the metal sleeve 4 provides the gardening tool 2 with a somewhat S-shaped side profile, when combined with the curvature of the $\pi$-shaped and V-shaped members 6 and 8.

The handle 12 is a Y-shaped handle comprising two substantially diverging metal brackets 12A, and a wooden roller 12B connected therebetween, to facilitate gripping of the handle 12.

While the gardening tool 2 has been described thus far with reference to the above embodiment, it is understood that the present invention is not limited to the exemplary shapes, materials, etc. described above. For example, the gardening tool 2 can be made of any rigid material, and is not limited to the metal and wood materials described herein. Furthermore, the wooden shaft 10 is provided for added leverage, but it is understood that the sleeve 4 can be shaped in the form of a handle and that the shaft need not be present. It is further understood that the diverging prongs need not be formed integrally with one another, and likewise, that the straight prongs need not be formed integrally with one another. Also, the straight prongs can be mounted at the outer extremes of the arced bracket 6A, so that the $\pi$-shaped member actually becomes a U-shaped member.

Figure 3:
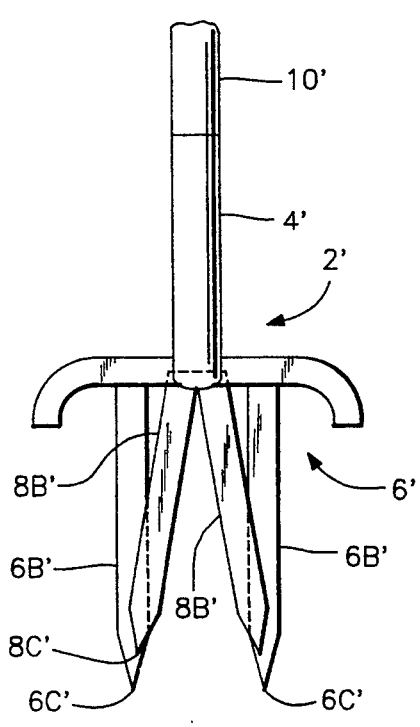
FIG. 3 is a top view of an alternative embodiment of the gardening tool of the present invention.
Figure 4:
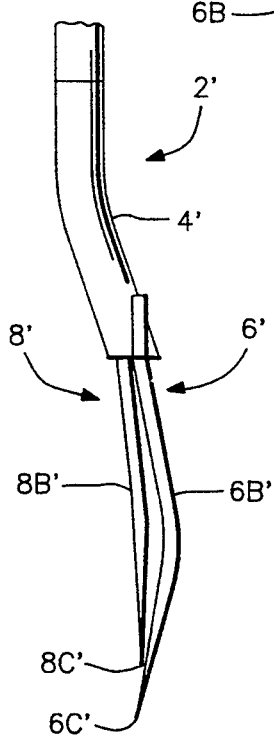
FIG. 4 is a side view of the alternative embodiment illustrated in FIG. 3.

An alternative embodiment of the gardening tool is illustrated in FIGS. 3 and 4. Here, the gardening tool 2' is essentially the same as that of the previous embodiment, except that instead of curving the $\pi$-shaped member 6' and the V-shaped member 8', the straight prongs 6B' are bent substantially at the longitudinal middle of the prongs. In addition, the thickness of both the diverging prongs 8B' and the straight prongs 6B', decreases gradually toward the tips to define blade-like and pointed distal tips 8C' and 6C'.

Use of the gardening tool 2 or 2' to exhume vegetation, such as weeds, vegetables, or bushes, will now be described.

Initially, the tool 2 or 2' is positioned above the vegetation, so that the prongs 8B and 6B straddle the vegetation. Next, the prongs of the gardening tool are driven into the ground, and the handle of the gardening tool is rocked back and forth to loosen the dirt surrounding the vegetation. After the dirt is sufficiently loosened, the vegetation can be simply pulled out of the ground with little effort.

If the initial rocking of the handle does not provide sufficient loosening of the dirt, the gardening tool can be pulled out from the ground, rotated ninety degrees about its longitudinal axis, and re-inserted into the ground. Subsequent rocking of the handle should loosen the dirt around the more stubborn, weeds, vegetables, etc., and thus allow the vegetation to be pulled out from the ground.

Inasmuch as the present invention straddles the vegetation of interest, there is little displacement of the ground beyond the immediate vicinity of this vegetation. Neighboring plants therefore remain undisturbed.

As noted above, the present invention is not limited to the particular embodiments described above, but rather is limited only by the scope of the claims appended hereto.

I claim:

1. A gardening tool comprising:
    a handle for manipulating the gardening tool;
    two straight prongs mounted laterally with respect to the handle, and extending parallel to one another from a first end of the handle; and
    a pair of medially mounted diverging prongs which are mounted to said first end of the handle, and extend in a gradually diverging manner from one another to define a V-shape, wherein said straight prongs and said diverging prongs have distal tips which overlap one another.

2. The gardening tool of claim 1, wherein said diverging prongs and said straight prongs include pointed distal tips to facilitate penetration into the ground.

3. The gardening tool of claim 1, wherein the distal tips of said straight prongs extend beyond the distal tips of the diverging prongs.

4. The gardening tool of claim 1, wherein said two straight prongs are connected to said first end of the handle by an arced bracket.

5. The gardening tool of claim 1, wherein said diverging prongs are integrally formed to define a V-shaped member having an apex connected to the first end of the handle.

6. The gardening tool of claim 1, wherein said handle further comprises an elongated shaft and a sleeve, said sleeve being disposed at said first end of the handle, with said elongated shaft being received in an open end of said sleeve.

7. The gardening tool of claim 1, wherein said handle further comprises two substantially diverging brackets, and a wooden roller connected therebetween, to facilitate gripping of the handle.

8. The gardening tool of claim 1, wherein the straight prongs are bent substantially at the longitudinal middle of said straight prongs.

9. The gardening tool of claim 1, wherein said diverging prongs and said straight prongs include pointed distal tips to facilitate penetration into the ground, and wherein the thickness of both the diverging prongs and the straight prongs, decreases gradually toward the distal tips to thereby define blade-like and pointed distal tips.

10. A gardening tool comprising:
    a handle for manipulating the gardening tool;
    two straight prongs mounted laterally with respect to the handle, and extending parallel to one another from a first end of the handle; and
    a pair of medially mounted diverging prongs which are mounted to said first end of the handle, and extend in a gradually diverging manner from one another to define a V-shape;
    wherein said two straight prongs are connected to said first end of the handle by an arced bracket; and
    wherein said arced bracket and said two straight prongs are arranged with respect to one another so as to define a $\pi$-shaped member.

11. The gardening tool of claim 10, wherein said diverging prongs are integrally formed to define a V-shaped member having an apex connected to the first end of the handle, both the $\pi$-shaped member and the V-shaped member being constructed from a substantially flat material which curves slightly as the V-shaped member and the $\pi$-shaped member connect to the handle.

12. The gardening tool of claim 11, wherein said handle is also curved, but oppositely with respect to the curvature of the $\pi$-shaped member and the V-shaped member, thereby providing the gardening tool with a slightly S-shaped side profile.

13. A gardening tool comprising:
    a hollow sleeve having an open end and a closed end;
    a $\pi$-shaped member attached to the closed end of the hollow sleeve, said $\pi$-shaped member having an arced bracket and two laterally disposed, substantially parallel and downwardly extending straight prongs;
    a V-shaped member also attached to the closed end of the hollow sleeve, said V-shaped member comprising an apex, and two medially mounted and gradually diverging prongs;
    an elongated shaft received in the open end of the hollow sleeve; and
    a handle connected to an end of the elongated shaft, opposite from the hollow sleeve.

14. The gardening tool of claim 13, wherein said diverging prongs and said straight prongs include pointed distal kips to facilitate penetration into the ground.

15. The gardening tool of claim 13, wherein said straight prongs and said diverging prongs have distal tips which overlap one another.

16. The gardening tool of claim 13, wherein said straight prongs and said diverging prongs have distal tips, and wherein the distal tips of said straight prongs extend beyond the distal tips of the diverging prongs.

17. The gardening tool of claim 13, wherein said $\pi$-shaped member and said V-shaped member are constructed from a substantially flat material which curves slightly as the V-shaped member and the $\pi$-shaped member connect to the hollow sleeve.

18. The gardening tool of claim 17, wherein said hollow sleeve is also curved, but oppositely with respect to the curvature of the $\pi$-shaped member and the V-shaped member, thereby providing the gardening tool with a slightly S-shaped side profile.

19. The gardening tool of claim 13, wherein said handle further comprises two substantially diverging brackets, and a wooden roller connected therebetween, to facilitate gripping of the handle.

20. The gardening tool of claim 13, wherein the straight prongs are bent substantially at the longitudinal middle of said straight prongs.

21. The gardening tool of claim 13, wherein said diverging prongs and said straight prongs include pointed distal tips to facilitate penetration into the ground, and wherein the thickness of both the diverging prongs and the straight prongs, decreases gradually toward the distal tips to thereby define blade-like and pointed distal tips.

* * * * *